(12) United States Patent
Ahn et al.

(10) Patent No.: US 8,760,431 B2
(45) Date of Patent: Jun. 24, 2014

(54) DISPLAY APPARATUS

(75) Inventors: Soon-Sung Ahn, Yongin (KR);
Yong-Sung Park, Yongin (KR); In-Ho Choi, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 499 days.

(21) Appl. No.: 12/500,530

(22) Filed: Jul. 9, 2009

(65) Prior Publication Data

US 2010/0013790 A1    Jan. 21, 2010

Related U.S. Application Data

(60) Provisional application No. 61/081,496, filed on Jul. 17, 2008.

(30) Foreign Application Priority Data

Mar. 2, 2009   (KR) .................. 10-2009-0017763

(51) Int. Cl.
*G06F 3/045*   (2006.01)
*G06F 3/042*   (2006.01)

(52) U.S. Cl.
USPC ......................................... 345/174; 345/175

(58) Field of Classification Search
USPC ............... 345/173–175, 104, 207; 178/18.06, 178/18.09, 18.11
See application file for complete search history.

(56) References Cited

U.S. PATENT DOCUMENTS

| 6,744,426 | B1 * | 6/2004 | Okamoto et al. ............. 345/179 |
| 7,098,592 | B2 | 8/2006 | Nishikawa |
| 2003/0234769 | A1 * | 12/2003 | Cross et al. .................. 345/173 |
| 2006/0164401 | A1 * | 7/2006 | Ishida ........................... 345/173 |
| 2007/0013819 | A1 | 1/2007 | Pak et al. |
| 2007/0052689 | A1 * | 3/2007 | Tak ................................ 345/173 |
| 2007/0063991 | A1 | 3/2007 | Lee et al. |
| 2007/0221331 | A1 | 9/2007 | Lee |
| 2007/0229475 | A1 * | 10/2007 | Gettemy et al. ............... 345/173 |
| 2008/0018612 | A1 * | 1/2008 | Nakamura et al. ............ 345/173 |
| 2008/0055267 | A1 | 3/2008 | Wu et al. |
| 2008/0062139 | A1 * | 3/2008 | Hotelling et al. ............. 345/173 |
| 2008/0252618 | A1 | 10/2008 | Chung et al. |
| 2009/0017874 | A1 * | 1/2009 | Hong et al. ................... 455/566 |
| 2009/0194341 | A1 * | 8/2009 | Nousiainen ................ 178/18.01 |
| 2009/0244026 | A1 * | 10/2009 | Purdy et al. ................... 345/174 |

FOREIGN PATENT DOCUMENTS

| CN | 1945387 A | 4/2007 |
| EP | 2 105 824 A1 | 9/2009 |
| JP | 02-162411 | 6/1990 |
| JP | 05-205570 | 8/1993 |

(Continued)

OTHER PUBLICATIONS

KIPO Office action dated Aug. 31, 2011, issued in priority Korean patent application No. 10-2009-0017763, pp. 1-3.

(Continued)

*Primary Examiner* — Hong Zhou

(74) *Attorney, Agent, or Firm* — Christie, Parker & Hale, LLP

(57) ABSTRACT

An embodiment of the present invention provides a display apparatus including: a first substrate; an optical layer on the first substrate, the optical layer comprising a plurality of pixels for displaying an image and an array of optical sensors for detecting a contact location on the display apparatus; and a contact detector detecting whether or not the display apparatus is touched.

24 Claims, 6 Drawing Sheets

(56) References Cited

FOREIGN PATENT DOCUMENTS

| | | |
|---|---|---|
| JP | 09-006525 | 1/1997 |
| JP | 2001-306255 | 11/2001 |
| JP | 2004-086711 | 3/2004 |
| JP | 2004-245949 | 9/2004 |
| JP | 2007-033789 | 2/2007 |
| JP | 2007-087393 | 4/2007 |
| JP | 2008-083322 | 4/2008 |
| KR | 10-2005-0013315 | 2/2005 |
| KR | 10-2006-0028538 A | 3/2006 |
| KR | 10-2009-0103745 | 10/2009 |
| TW | 200620078 | 6/2006 |
| TW | 200813919 | 3/2008 |
| TW | 200816036 | 4/2008 |
| WO | WO 2005/073834 A2 | 8/2005 |

OTHER PUBLICATIONS

Korean Office action dated Nov. 30, 2010 issued to corresponding Korean Patent Application No. 10-2009-0017763.
European Search Report dated Apr. 26, 2011, for corresponding European Patent application 09251825.7.
Japanese Office action dated Sep. 20, 2011, for corresponding Japanese Patent application 2009-168225, 2 pages.
Japanese Office action dated Jan. 8, 2013, corresponding to Japanese Patent application 2009-168225, (2 pages).
SIPO Office action dated Jan. 23, 2013, for corresponding Chinese Patent application 200910164590.0, (10 pages).
JPO Office action dated May 21, 2013, for corresponding Japanese Patent application 2009-168225, (21 pages).
Taiwan Office action dated Apr. 17, 2013, for corresponding Taiwanese Patent application 098124061, (16 pages).

* cited by examiner

DISPLAY APPARATUS

CROSS-REFERENCE TO RELATED PATENT APPLICATION

This application claims priority to and the benefit of U.S. Provisional Application No. 61/081,496, filed on Jul. 17, 2008, in the United States Patent and Trademark Office, and Korean Patent Application No. 10-2009-0017763, filed on Mar. 2, 2009, in the Korean Intellectual Property Office, the entire contents of which are incorporated herein by reference.

BACKGROUND OF THE INVENTION

1. Field of the Invention

The present invention relates to a display apparatus having a function of inputting information via an optical sensor.

2. Description of the Related Art

Conventionally, a mouse or a keyboard is used in order to supply an input signal to a computer. Also, a remote control is used for a user to select a specific function in a digital television (TV). However, a user may have difficulties using input devices, such as a mouse, a keyboard, or a remote control if he is not accustomed to handling them.

Touch panels or touch screens are innovative input devices that are developed to remove such difficulties. The touch panels allow a user to input a command signal by directly touching a display panel with the user's finger or a pen rather than by using, for example, a mouse. Accordingly, users who have difficulty with using an input device, such as a mouse or a keyboard, may use a digital apparatus such as a computer without difficulties simply by directly touching a display panel with, for example, his/her finger. Touch panels may be categorized according to a method of sensing an external input. For example, the touch panels may be categorized into those using electrostatic capacitance, those using a resistive layer, those using ultrasonic waves, those using an integral method of measuring tension, those using the piezo effect, and those using optical sensing.

In particular, in touch panels using optical sensing, contact made by, for example, a user's finger is sensed by forming a photo diode in a panel and sensing current generated by light that is incident on the photo diode. The photo diode that is an element essential to such touch panels is simple to manufacture since it can be manufactured in a process of forming a driving circuit of a display panel, such as a liquid crystal display (LCD) or an organic light emitting diode (OLED).

However, with a conventional method of sensing light, it is difficult to determine whether or not an object, such as a user's finger or a light pen, touches a screen and to precisely calculate the coordinates of the object. Also, with the conventional method, is disadvantageous in that erroneous sensing may be caused by a shadow of an object and a large amount of power may be consumed by a light sensor scanning circuit operating regardless of whether or not contact is made by a specific object and a circuit for reading out a signal sensed.

SUMMARY OF THE INVENTION

An aspect of an embodiment of the present invention is directed toward a display apparatus having a function of displaying information on a screen by utilizing light, which is capable of not only determining whether or not there is contact by utilizing an additional device without having to interpret a captured image but also determining the location of the contact by using an optical sensor.

Another aspect of an embodiment of the present invention also provides a method of enabling low power consumption by utilizing the display apparatus.

An embodiment of the present invention provides a display apparatus including: a first substrate; an optical layer on the first substrate, the optical layer comprising a plurality of pixels for displaying an image and an array of optical sensors for detecting a contact location on the display apparatus; and a contact detector detecting whether or not the display apparatus is touched.

The contact detector may include a variable capacitor for detecting whether or not the display apparatus is touched through capacitance measurement.

The variable capacitor may include a contact detecting layer on the optical layer and a cathode electrode of the pixels.

The display apparatus may further include a second substrate between the contact detecting layer and the optical layer.

The display apparatus may further include a dielectric layer on the contact detecting layer.

The variable capacitor may include: a first contact detecting layer; and a second contact detecting layer spaced from and parallel to the first contact detecting layer.

The display apparatus may further include a dielectric layer between the first and second contact detecting layers.

The display apparatus may further include a second substrate between the first and second contact detecting layers.

The display apparatus may further include a dielectric layer between the first and second contact detecting layers.

The dielectric layer may include a material having a dielectric constant or a gap that changes according to pressure applied to the dielectric layer.

The display apparatus may further include a second substrate between the dielectric layer and the second contact detecting layer.

The display apparatus may further include a second substrate between the second contact detecting layer and the optical layer.

The display apparatus may further include a second substrate on the optical layer, and wherein the contact detector may include a touch film on the second substrate for transforming pressure applied at the contact location into an electrical signal.

The touch film may include a transparent conductive film, or a transparent film coated with a conductive material.

The touch film may include at least one material selected from the group consisting of polyethylene terephthalate resin, poly ether sulfone, poly carbon, poly arylate, indium tin oxide, tin oxide, zinc oxide, CdSnO4, and combinations thereof.

The touch film may be configured to transform the applied pressure into the electric signal utilizing at least one of a pressure-sensitive method, a resistance layer method or a capacitance method.

The contact detector may include a pressure-sensitive sensor under the first substrate configured to change resistance in response to pressure applied.

Another embodiment of the present invention provides a display apparatus including: a display panel including: a plurality of pixels for displaying an image; a plurality of optical sensors detecting a contact location of an object on the display panel; and a contact detecting layer for detecting whether or not the display panel is touched with an object; and a contact location determining unit for determining the contact location on the display panel in accordance with a signal output by the optical sensors.

The contact detecting layer may be embedded within the display panel.

The contact detecting layer may be on a surface of the display panel.

The contact location determining unit may include a contact measuring unit for receiving contact information from the contact detecting layer and measuring a degree of change in the contact information.

The contact information may include at least one of capacitance, a dielectric constant, a gap, and a resistance value.

The contact location determining unit may further include a contact determining unit for determining whether or not the display panel is contacted in accordance with the degree of change in the contact information output by the contact measuring unit.

The contact determining unit may be configured to determine whether or not the display panel is contacted by comparing the degree of change in the contact information with a reference value.

The contact location determining unit may further include a signal generating unit for generating a first signal or a second signal, where the first signal instructs that the optical sensors be driven and information be read from the optical sensors when the contact is detected and the second signal instructs that the driving of the optical sensors and the reading of the information from the optical sensors be discontinued when the contact is not detected.

The display apparatus may further include a sensor array driving unit driving the optical sensors when the first signal is received from the signal generating unit.

The display apparatus may further include a sensor information reading unit receiving sensed signals from the optical sensors and providing the sensed signals to the contact location determining unit.

The contact location determining unit may further include a coordinate calculating unit determining the contact location in accordance with the sensed signals received from the sensor information reading unit.

Another embodiment of the present invention provides a method of determining a contact location on a display apparatus that includes a display panel having a plurality of pixels, an array of optical sensors and a contact detecting layer, a sensor array driving unit, a sensor information reading unit, and a contact location determining unit, the method including: detecting contact information of an object on the display panel utilizing the contact detecting layer; if there is no contact, deactivating the sensor array driving unit and the sensor information reading unit; and if there is a contact, activating the sensor array driving unit and the sensor information reading unit to read sensed signals from the optical sensors.

The method may further include obtaining an image of the object which contacts the display panel according to scan signals received from the sensor array driving unit.

The method may further include calculating coordinates of a location of the contact by analyzing the image.

Another embodiment of the present invention provides a display apparatus including: an image display unit including a display region; a contact detection unit for determining whether or not the display apparatus is touched; and a contact location identifying unit for determining a location on the display region that is touched.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
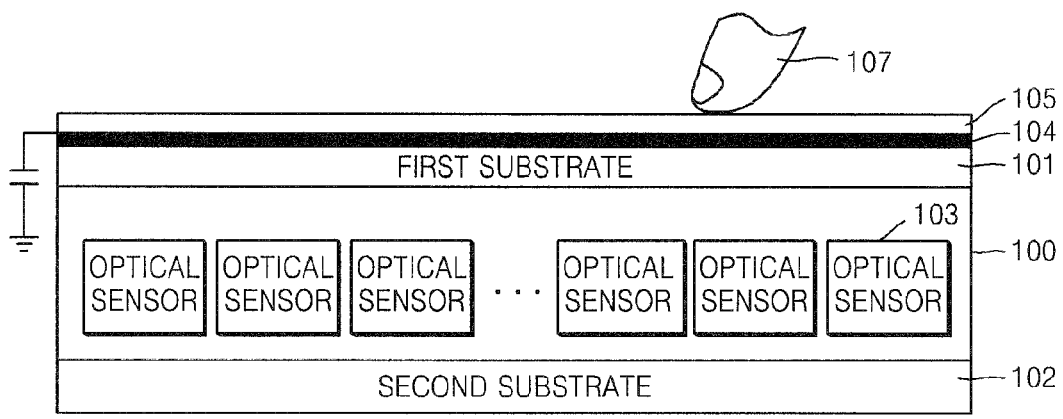
FIG. 1 is a cross-sectional view of a panel using a thin layer to determine whether or not there is contact, according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals denote like elements throughout the drawings.

FIG. 1 is a cross-sectional view of a panel using a thin layer to determine whether or not there is contact, according to an embodiment of the present invention. Referring to FIG. 1, the panel includes an optical sensor array layer 100 having a plurality of optical sensors 103, a first substrate 101, a second substrate 102, a contact detecting layer 104, and a dielectric layer 105.

The optical sensor array layer 100 is placed on the second substrate 102. In the present embodiment, the optical sensors 103 are interposed between the first substrate 101 and the second substrate 102, however, the present invention is not limited thereto, and also a plurality of thin film transistors and various display apparatus can be interposed between the first substrate 101 and the second substrate 102. The first and second substrates 101 and 102 may be formed of glass, metal, or plastic. Although not shown in the current embodiment, the optical sensor array layer 100 may include a plurality of electrodes constituting thin film transistor (TFT) layers, e.g., a semiconductor layer and an insulating layer, and an organic light emitting device. The organic light emitting device includes a pixel electrode, an opposite electrode facing the pixel electrode, and an intermediate layer including a light emitting layer interposed between the pixel electrode (e.g., anode electrode) and the opposite electrode (e.g., cathode electrode).

When a specific object, e.g., a finger 107, contacts the panel, then the optical sensors 103 calculate the coordinates of the location of contacting the panel by interpreting a shadow image of the finger 107 generated from a light source, create a binary image by interpreting the amount of light and interpret the coordinates of the location of contacting the panel from the binary image, or create a binary image by interpreting the amount of light reflected from an internal light source and calculate the coordinates of the location of contacting the panel. The optical sensors 103 may be PIN type photo diodes.

The contact detecting layer 104 is interposed between the first substrate 101 and the dielectric layer 105, and formed using a transparent thin layer in order to increase light transmissivity, thereby reducing (or preventing) the degradation of performance of a display apparatus. Also, the contact detecting layer 104 may be embedded into a panel substrate during manufacture of the panel or be additionally formed on the panel substrate. If the finger 107 touches or contacts the panel, the contact detecting layer 104 detects a capacitance change caused by the finger 107. In this case, the contact detecting layer 104 and the panel form a capacitor. In the current embodiment, the contact detecting layer 104, and the cathode electrode under the first substrate 101 form a capacitor. Here, the cathode electrode is included in the organic light emitting device included in the optical sensor array layer 100. Thus, an additional electrode or layer does not need to be formed in order to form a capacitor together with the contact detecting layer 104. In the current embodiment, as described above, in a display apparatus having a function of displaying information on a screen by utilizing the contact detecting layer 104, whether or not there is a contact can be determined by detecting a capacitance change, which is caused by the contacting, in the contact detecting layer 104, without interpreting a captured image using the optical sensors 103. For example, it is possible to skip a complicated image interpretation process in which edges are detected, whether or not there is an edge moving in a different direction from the other edges is calculated, and whether or not there is contact is determined based on the calculation result. Thus, the optical sensors 103 can individually calculate the coordinates of the location of the contacting, without interpreting a captured image. Here, if a capacitance value detected by the contact detecting layer 104 is less than or greater than a threshold capacitance value (e.g., predetermined threshold capacitance value), a host or a contact determining module determines that there is contact with the finger 107, for example. Alternatively, the amount of calculating performed to determine the coordinates of the location of the contacting can be reduced by using information regarding the contacting detected by the contact detecting layer 104, when the optical sensors 103 calculate the location of the contacting.

In a conventional display apparatus having a function of displaying information on a screen using light, edges are detected from a captured image, and whether or not an object contacts the screen is determined using the detected edges. That is, the directions of the edges are detected, and it is determined that the object contacts the screen when there is an edge moving in a different direction than the other edges. If it is determined that the object contacts the screen, the coordinates of the location of the contacting are obtained by calculating the center of gravity of the edge moving in the different direction. However, according to an embodiment of the present invention, whether or not an object, and particularly, a finger, contacts a screen is more easily determined using a contact detecting layer than according to a conventional image processing method, thereby reducing the amount of calculations of a central processing unit (CPU) and the load on memory. Also, it is possible to reduce (or prevent) erroneous sensing caused by the shadow of an object, which is more likely to occur in a conventional image analysis method.

The dielectric layer 105 is formed on the contact detecting layer 104, and reduces or prevents external natural light from being incident upon a light emitting display apparatus or the optical sensors 103 or reflects the external natural light therefrom. The dielectric layer 105 may be omitted if necessary.

Figure 2:
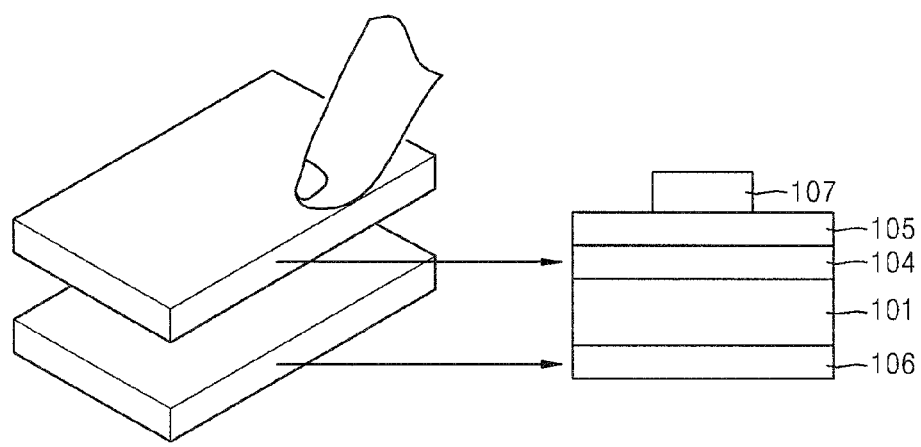
FIG. 2 is a perspective and cross-sectional view of a panel of an organic light emitting display apparatus using a thin layer to determine whether or not there is contact, according to another embodiment of the present invention.

FIG. 2 is a perspective and cross-sectional view illustrating the forming of a capacitor by utilizing the contact detecting layer 104 of FIG. 1. Referring to FIG. 2, the contact detecting layer 104 that is contacted with the finger 107 functions as an electrode of a capacitor, and a cathode electrode 106 that is formed under a first substrate 101 functions as the other electrode of the capacitor, where the other electrodes are opposite to each other. Thus, the contact detecting layer 104 and the cathode electrode 106 form a capacitor and measure a capacitance change caused by the contact of the finger 107. In another embodiment of the present invention, if a display light emitting device is an organic light emitting device, an additional electrode/layer is not necessary to form a capacitor together with the contact detecting layer 104 since the cathode electrode 106 of the organic light emitting device included in the optical sensor array layer 100 is formed under the first substrate 101 to cover (e.g., completely cover) the bottom of the first substrate 101.

Figure 3:
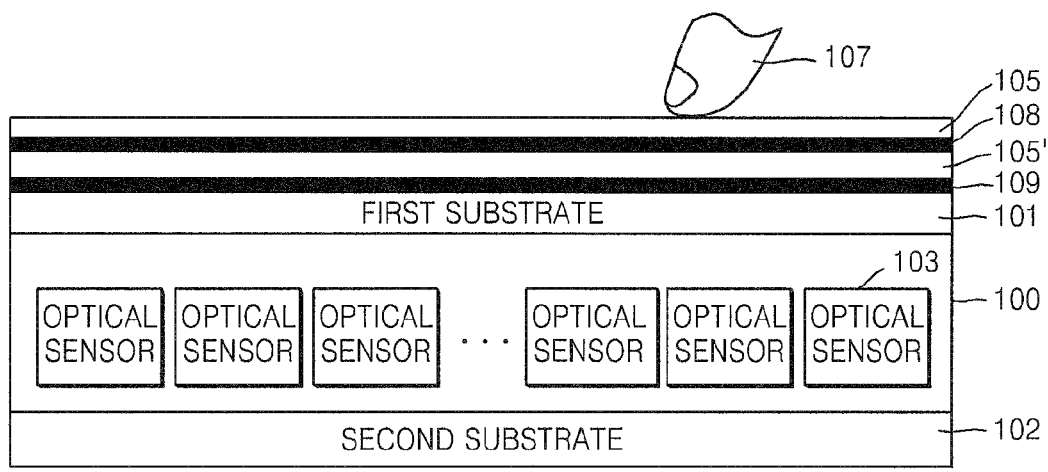
FIG. 3 is a cross-sectional view of a modified embodiment of the panel illustrated in FIG. 1 according to one embodiment of the present invention.

FIG. 3 is a cross-sectional view of a modified embodiment of the panel illustrated in FIG. 1 according to the present invention. Referring to FIG. 3, the panel includes the optical sensor array layer 100 having the plurality of optical sensors 103, the first substrate 101, the second substrate 102, a first contact detecting layer 108, a second contact detecting layer 109, and the dielectric layer 105. The panel illustrated in FIG. 3 is the same as the panel in FIG. 1 except for the first and second contact detecting layers 108 and 109. Thus, the reference numerals that are the same as those of FIG. 1 denote the same elements, and a description of their operations or characteristics will not be repeated. The panel of FIG. 3 will now be described with respect to these differences.

The second contact detecting layer 109 is formed on the first substrate 101, and the first contact detecting layer 108 is formed on the second contact detecting layer 109. The first contact detecting layer 108 and the second contact detecting layer 109 form a capacitor and detect a capacitance change caused by contact of the finger 107. As illustrated in FIG. 3, there is a space 105' between the first contact detecting layer 108 and the second contact detecting layer 109. The space 105' may be filled with a dielectric material (e.g., a predetermined dielectric material). Although the present invention has been described with respect to an organic light emitting device in the above embodiments, it would be obvious to one of ordinary skill in the art that the present invention can be applied to other types of flat display apparatus, e.g., a liquid crystal display (LCD) or a plasma display panel (PDP), as long as they are devices capable of determining input information using an optical sensor.

Figure 4:
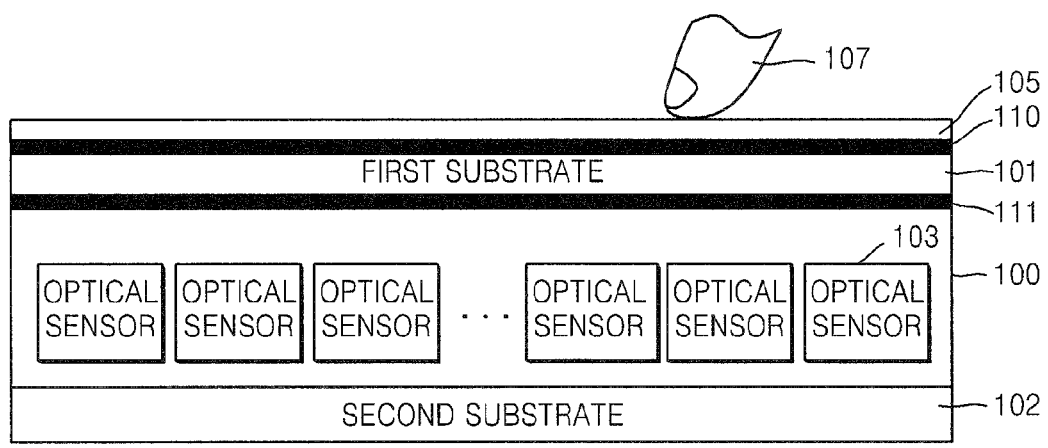
FIG. 4 is a cross-sectional view of another modified embodiment of the panel illustrated in FIG. 1 according to one embodiment of the present invention.

FIG. 4 is a cross-sectional view of another modified embodiment of the panel illustrated in FIG. 1 according to the present invention. Referring to FIG. 4, the panel includes the optical sensor array layer 100 having the plurality of optical sensors 103, the first substrate 101, the second substrate 102, a first contact detecting layer 110, a second contact detecting layer 111, and a dielectric layer 105. The panel illustrated in FIG. 4 is the same as the panel in FIG. 1 except for the first and second contact detecting layers 110 and 111. Thus, the reference numerals that are the same as those of FIG. 1 denote the same elements, and a description of their operations or characteristics will not be repeated. The panel of FIG. 4 will now be described with respect to these differences.

Referring to FIG. 4, the first contact detecting layer 110 is formed on first substrate 101, and the second contact detecting layer 111 is formed under the first substrate 101. The first contact detecting layer 110 and the second contact detecting layer 111 form a capacitor and measure a capacitance change due to contact of the panel with a finger.

Figure 5A:
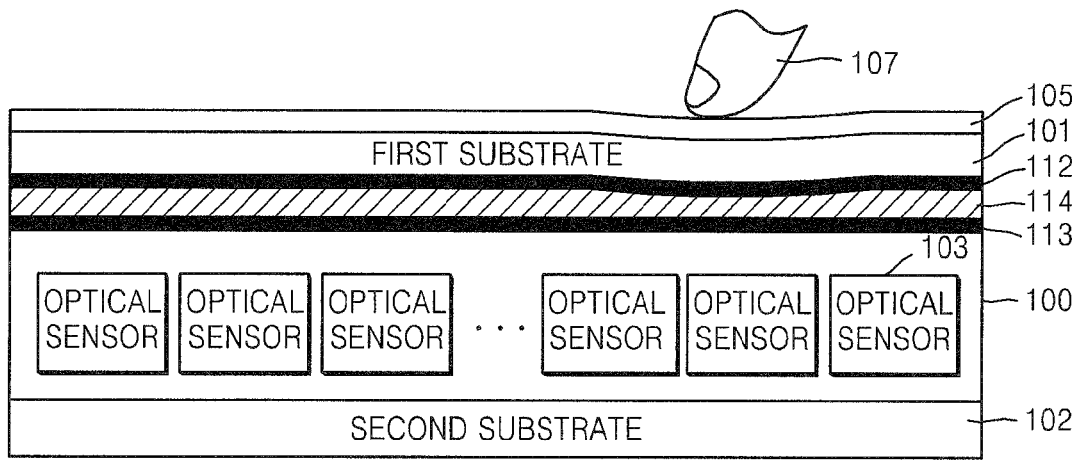
FIGS. 5A, 5B, and 5C are cross-sectional views of a panel utilizing a thin layer to determine whether or not there is contact, according to other embodiments of the present invention.
Figure 5B:
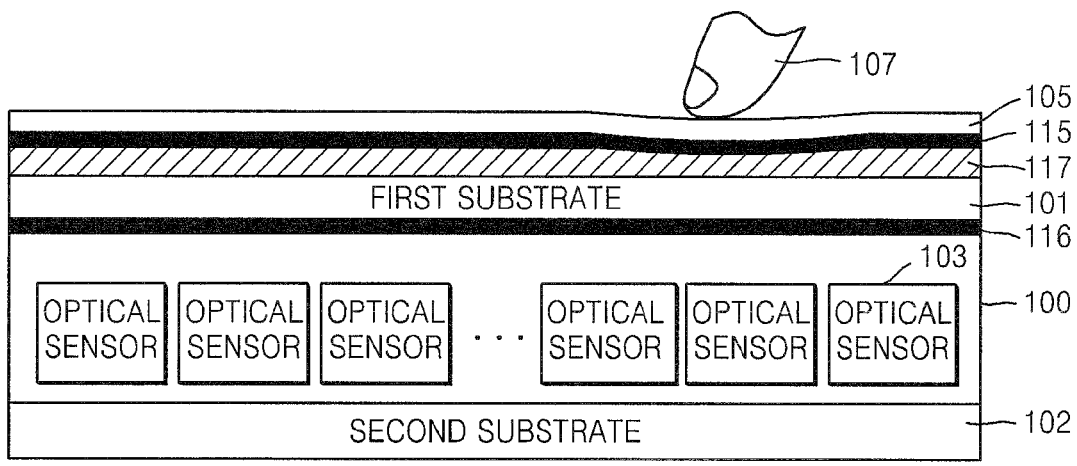
Figure 5C:
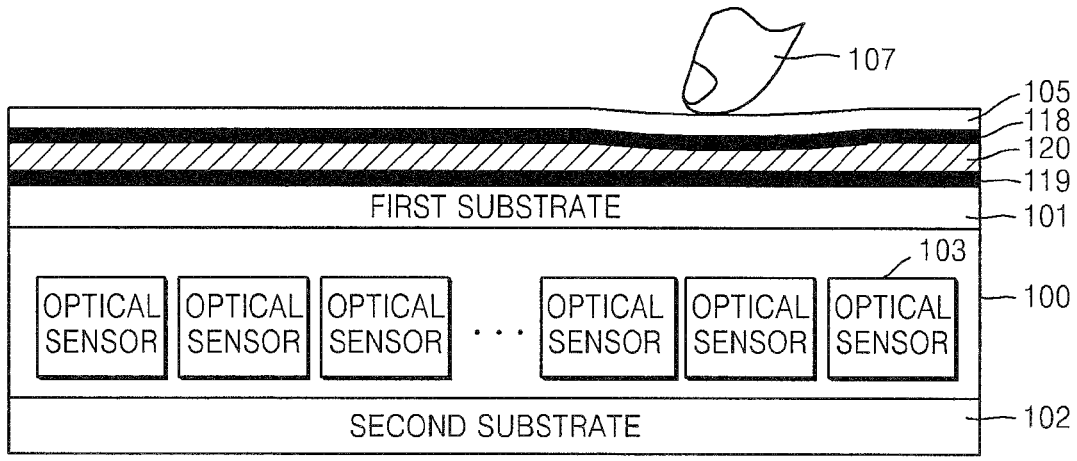

FIGS. 5A, 5B, and 5C are cross-sectional views of a panel utilizing a thin layer to determine whether or not there is contact, according to other embodiments of the present invention.

One or two contact detecting layers are used to detect a capacitance change in the previous embodiments described with reference to FIGS. 1 through 4, whereas a dielectric constant or dielectric change between contact detecting layers is used to detect a capacitance change in the current embodiment. Thus, whether or not there is contact with a finger can be easily determined by measuring a change in the dielectric constant or the gap between the contact detecting layers according to pressure applied by the contacting of the finger, without an optical sensor. Also, it is possible to reduce or prevent erroneous sensing caused by the shadow of something other than the finger, which is more likely to occur in a conventional image interpretation method.

The coordinates of the location of the contacting by the finger are calculated using an optical sensor, like in the previous embodiments described with reference to FIGS. 1 through 4.

Referring to FIG. 5A, the panel includes the optical sensor array layer 100 having the plurality of optical sensors 103, the first substrate 101, the second substrate 102, a first contact detecting layer 112, a second contact detecting layer 113, a dielectric 114, and the dielectric layer 105.

The first contact detecting layer 112 is placed under the first substrate 101, and the second contact detecting layer 113 is spaced a distance, which may be predetermined, from the first contact detecting layer 112. A space between the first contact detecting layer 111 and the second contact detecting layer 113 is filled with the dielectric 114. In the described embodiment, the dielectric 114 is a material, whose dielectric constant or gap changes according to pressure applied thereto.

When the finger 107 contacts the panel, the dielectric constant or gap between the first contact detecting layer 112 and the second contact detecting layer 113 changes according to pressure applied to the panel by the contacting finger 107. Accordingly, whether or not the panel is contacted can be easily determined by detecting a change in the dielectric constant or gap between the first and second contact detecting layers 112 and 113.

FIG. 5B is a cross-sectional view of a modified example of the panel illustrated in FIG. 5A according to the present invention. Referring to FIG. 5B, the panel includes the optical sensor array layer 100 having the plurality of optical sensors 103, the first substrate 101, the second substrate 102, a first contact detecting layer 115, a second contact detecting layer 116, a dielectric 117, and the dielectric layer 105. The panel illustrated in FIG. 5B is different from the panel in FIG. 5A in terms of the locations of the first and second contact detecting layers 115 and 116. The reference numerals that are the same as those of FIGS. 1 and 5A denote the same elements, and a description of their operations or characteristics will not be repeated. The panel of FIG. 5B will now be described with respect to these differences.

The second contact detecting layer 116 is placed under the first substrate 101, and the dielectric is applied on the first substrate 101. The first contact detecting layer 115 is formed on the dielectric 117.

When the finger 107 contacts the panel, the dielectric constant of the dielectric 117 under the first contact detecting layer 115 or the gap between the first and second contact detecting layers 115 and 116 changes. Thus, whether or not the panel is contacted can be easily determined by detecting a change in the dielectric constant or the gap between the first and second contact detecting layers 115 and 116.

FIG. 5C is a cross-sectional view of another modified example of the panel illustrated in FIG. 5A according to the present invention. Referring to FIG. 5C, the panel includes the optical sensor array layer 100 having the plurality of optical sensors 103, the first substrate 101, the second substrate 102, a first contact detecting layer 118, a second contact detecting layer 119, a dielectric 120, and the dielectric layer 105. The panel illustrated in FIG. 5C is different from the panel in FIG. 5A in terms of the locations of the first and second contact detecting layers 118 and 119. The reference numerals that are the same as those of FIGS. 1 and 5A denote the same elements, and a description of their operations or characteristics will not be repeated. The panel of FIG. 5C will now be described with respect to these differences.

The second contact detecting layer 119 and the first contact detecting layer 118 are sequentially formed in this order on the first substrate 101, and a space between the first and second contact detecting layers 118 and 119 is filled with the dielectric 120. If the finger 107 contacts the panel, the dielectric constant of the dielectric 120 under the first contact detecting layer 118 or the gap between the first and second contact detecting layers 118 and 119 changes. Thus, whether or not the panel is contacted can be easily determined by detecting a change in the dielectric constant of the dielectric 120 or the gap between the first and second contact detecting layers 118 and 119.

Figure 6:
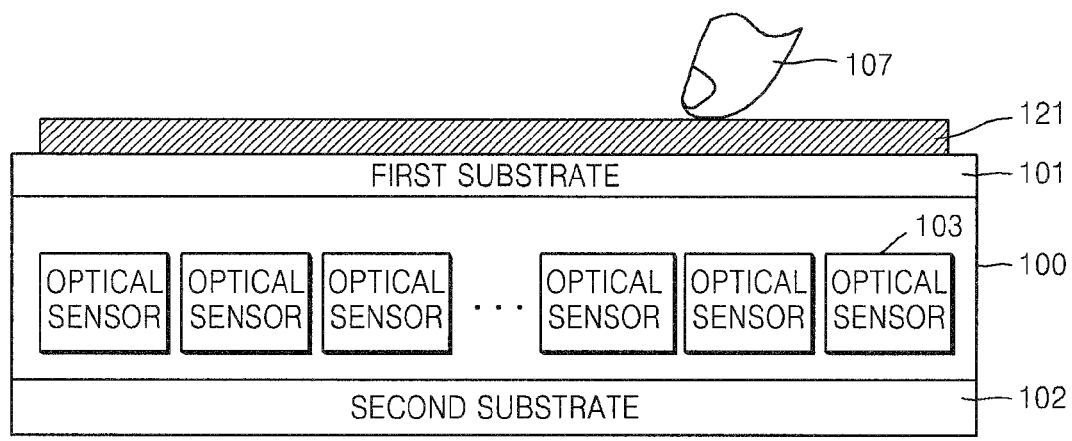
FIG. 6 is a cross-sectional view of panels illustrated in FIGS. 5A, 5B, and 5C modified according to embodiments of the present invention.

FIG. 6 is a cross-sectional view of a panel using a touch film 121 to determine whether or not the panel is contacted, according to another embodiment of the present invention. Referring to FIG. 6, the panel includes the optical sensor array layer 100 having the plurality of optical sensors 103, the first substrate 101, the second substrate 102, and the touch film 121.

The touch film 121 is adhered to a top surface of the first substrate 101. The touch film 121 is preferably a transparent conductive film, and transforms pressure applied by the finger 107 into an electrical signal. The touch film 121 preferably has characteristics, such as low surface resistance, high light transmissivity, high adhering properties, a smooth surface, and heat resistance. In general, a transparent conductive film is categorized into a transparent film having conductivity and a transparent film coated with a conductive material. A base film of the transparent conductive film may be formed of polyethylene terephthalate (PET) resin, poly ether sulfone (PES), poly carbon (PC), or poly arylate (PAR). The transparent conductive film may be formed of an indium tin oxide (ITO), a tin oxide, ZnO, or CdSnO4.

The determination of whether or not the panel is contacted by using the touch film 121 may be performed according to a pressure-sensitive method, a resistance layer method, and/or a capacitance method.

Figure 7:
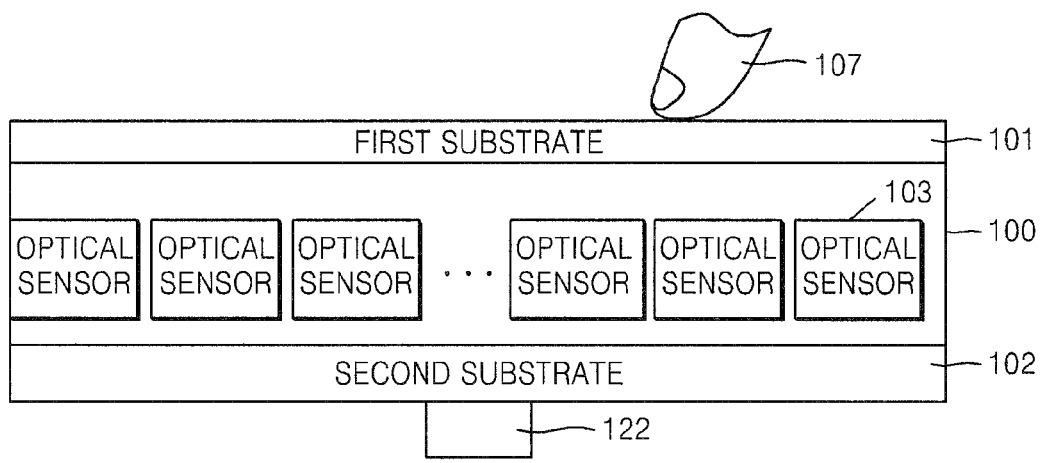
FIG. 7 is a cross-sectional view of panels illustrated in FIGS. 5A, 5B, and 5C modified according to an embodiment of the present invention.

FIG. 7 is a cross-sectional view of a panel using a pressure sensor 122, according to another embodiment of the present invention. Referring to FIG. 7, the panel includes the optical sensor array layer 100 having the plurality of optical sensors 103, the first substrate 101, the second substrate 102, and the pressure-sensitive sensor 122.

The pressure-sensitive sensor 122 is placed under the second substrate 102, and transforms pressure, which is caused by contacting the panel with the finger 107, into an electrical signal. Thus, whether or not the panel is contacted can be easily determined by detecting such an electrical signal. The pressure-sensitive sensor 122 measures the distribution of pressure. If pressure is applied on a part of the pressure-sensitive sensor 122, the resistance value of the pressure-sensitive conductive rubber of the pressure sensor 122 decreases, and thus, whether or not an object, and particularly, the finger 107, contacts the panel can be determined by detecting a change in the resistance value of the pressure sensor 122.

Figure 8:
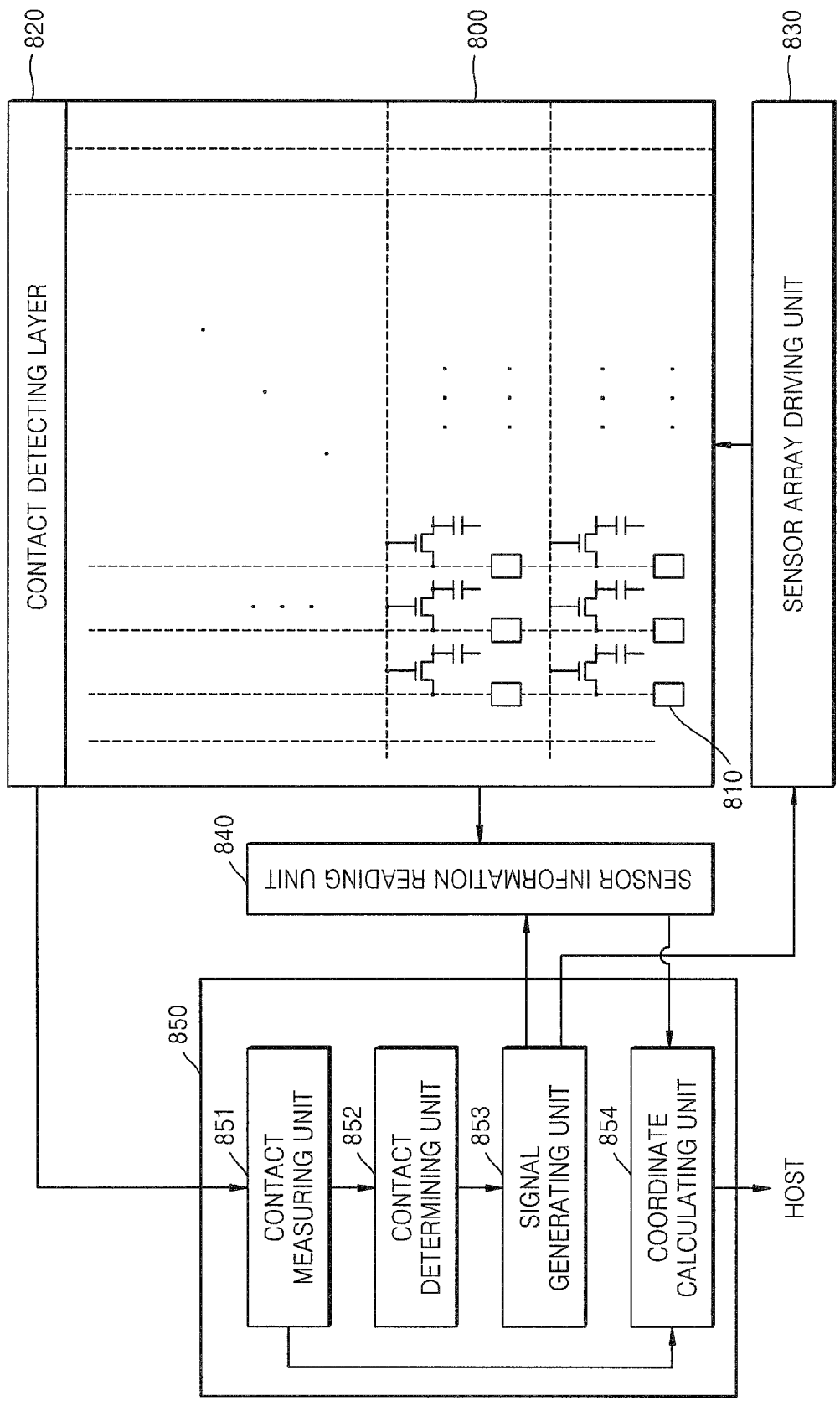
FIG. 8 is a block diagram schematically illustrating a display apparatus having an information input device using light, according to an embodiment of the present invention.

FIG. 8 is a block diagram schematically illustrating a display apparatus having a location information obtaining device 850, according to an embodiment of the present invention. Referring to FIG. 8, the display apparatus includes a display panel 800 having a plurality of optical sensors 810, a contact detecting layer 820 that is embedded into or adhered to the display panel 800, a sensor array driving unit 830 providing a scan signal to each of the optical sensors 810, a sensor information reading unit 840 reading data obtained by each of the optical sensors 810, and the location information obtaining device 850. The location information obtaining device 850 includes a contact measuring unit 851, a contact determining unit 852, a signal generating unit 853 and a coordinate calculating unit 854.

When a specific object, e.g., a finger, contacts the display apparatus, each of the optical sensors 810 calculates the coordinates of the location of the contacting by interpreting the finger's shadow image generated from a natural light source, creates a binary image by interpreting the amount of light and interprets the coordinates of the location of the contacting from the binary image, or creates a binary image by interpreting the amount of light that reflected from an internal light source and calculates the coordinates of the location of the contacting from the binary image. The display panel 800 includes red (R), green (G), and blue (B) pixels arranged at points where a plurality of signal lines and a plurality of scan lines cross one another, together with the optical sensors 810. The display panel 800 displays an image based on an image signal received from an external host.

The contact detecting layer 820 obtains contact information by detecting whether or not a specific object, and particularly, a finger, contacts a display screen, and provides the contact information to the location information obtaining device 850. According to the previous embodiments, such contact information specifies capacitance, a dielectric constant, a gap, a resistance value, and so on. The structure and location of the contact detecting layer 820 are as described above with reference to FIGS. 1 through 7.

If it is determined that the finger contacts the display screen, the sensor array driving unit 830 transmits to the display panel 800 a scan signal that instructs one of the optical sensors 810 be selected.

The sensor information reading unit 840 reads a signal sensed by the selected optical sensor 810 of the display panel 800, and provides the sensing result to the location information obtaining device 850.

The location information obtaining device 850 receives the sensed signal via the sensor information reading unit 840, calculates the coordinates of the location of the contacting based on the sensed signal, and outputs the calculation result to the external host. Also, the location information obtaining device 850 receives the contact information from the contact detecting layer 820, and controls whether or not to operate the sensor array driving unit 830 and the sensor information reading unit 840, based on the contact information. In particular, if a finger does not contact the display screen, the location information obtaining device 850 discontinues the operations of the sensor array driving unit 830 and the sensor information reading unit 840, thereby reducing power consumption or realizing lower power consumption. Alternatively, the operations of the sensor array driving unit 830 and the sensor information reading unit 840 may be discontinued partially rather than completely so that they can operate at high speeds when the display screen is actually contacted.

The contact measuring unit 851 receives the contact information from the contact detecting layer 820, and measures the degree of change in the contact information. The contact information specifies capacitance, a dielectric constant, a gap, a resistance value, and so on. The contact measuring unit 851 measures the degree of change in the contact information caused by the contact of a finger, i.e., a change in capacitance, a dielectric constant, a gap, a resistance value, and so on.

The contact determining unit 852 receives the degree of change in the contact information from the contact measuring unit 851, and compares the degree of change in the contact information with a reference value (that may be a predetermined reference value) in order to determine whether or not the display screen is contacted. The reference value is provided from an external host and then stored. According to the previous embodiment described with reference to FIG. 1, the contact determining unit 852 determines that the display screen is contacted when a capacitance value measured by the contact measuring unit 851 increases more than a reference capacitance value (that may be a predetermined reference capacitance value) at specific rates. In particular, if it is determined that the display screen is not contacted, the contact determining unit 852 controls the signal generating unit 853 to generate a signal instructing that the operations of the sensor array driving unit 830 and the sensor information reading unit 84 be discontinued. Here, the signal may be logic low or logic high.

The signal generating unit 853 generates and outputs either a signal for operating the sensor array driving unit 830 and the sensor information reading unit 840, or a signal for discontinuing the operations thereof, under the control of the contact determining unit 852. If the display screen is not contacted, the operations of internal circuits for calculating the location of contacting, i.e., the operations of the sensor array driving unit 830 that select one of the optical sensors 810 and the sensor information reading unit 840, are discontinued thereby reducing power consumption or realizing lower power consumption. Also, it is possible to reduce or prevent erroneous sensing caused by the shadow of something other than the finger, which is more likely to occur in a conventional image analysis method.

Figure 9:
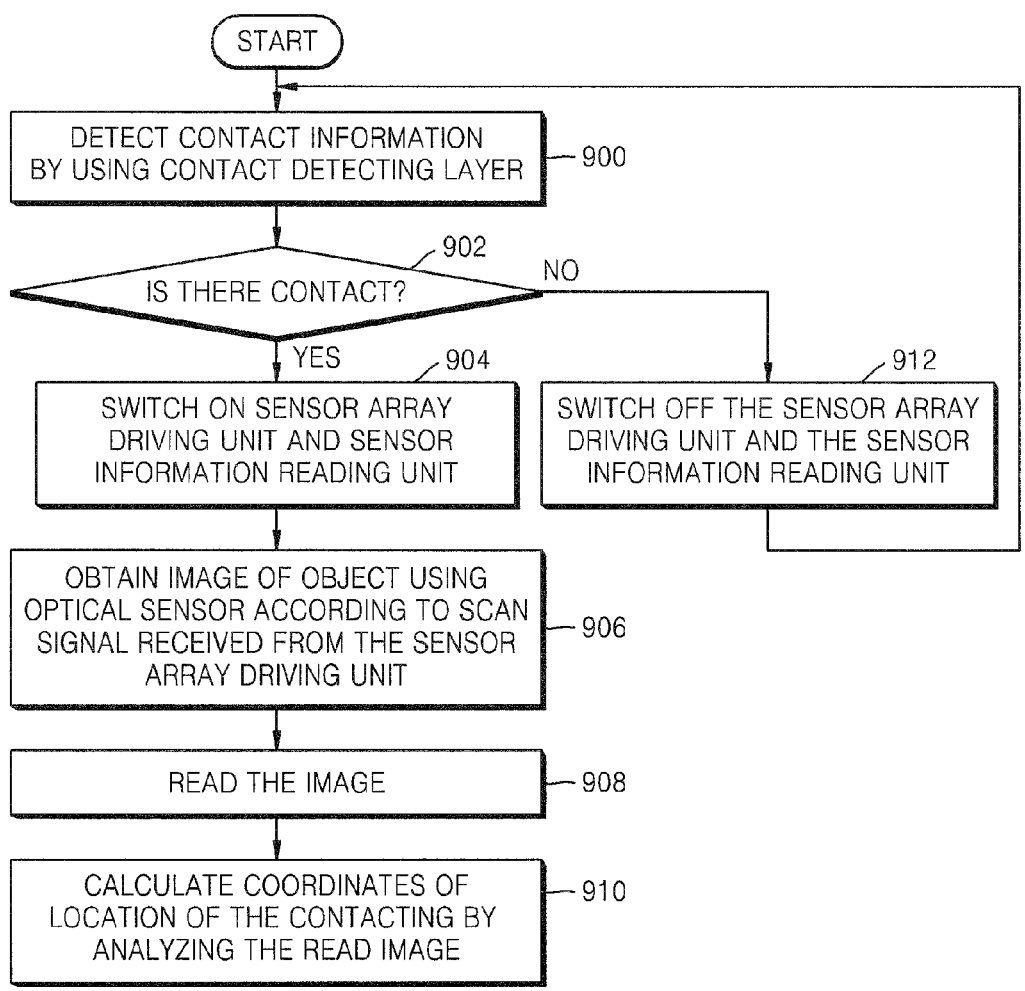
FIG. 9 is a flowchart illustrating a method of enabling low power consumption of the display apparatus of FIG. 8, according to an embodiment of the present invention.

FIG. 9 is a flowchart illustrating a method of reducing power consumption or realizing lower power consumption of the display apparatus of FIG. 8, according to an embodiment of the present invention. Referring to FIG. 9, in operation 900, contact information indicating whether or not a specific object, and particularly, a finger, contacts the display apparatus is detected using a contact detecting layer. In operation 902, whether or not there is contact is determined using the contact information. If it is determined in operation 902 that there is contact, a sensor array driving unit and a sensor information reading unit are switched on in operation 904. In operation 906, an image of the object, and particularly, an image of the finger, is obtained using an optical sensor according to a scan signal received from the sensor array driving unit. In operation 908, the image is read according to a read-out signal received from a sensor information reading unit. In operation 910, the coordinates of the location of the contacting are calculated by analyzing the read image.

Otherwise, if it is determined in operation 902 that there is no contact, the sensor array driving unit and the sensor information reading unit are switched off, in operation 912. Accordingly, when the display apparatus is not actually contacted, all circuits having a sensor are switched off, thereby reducing power consumption or realizing lower power consumption. Alternatively, lower power consumption can be realized by switching off only some of the operations of the sensor array driving unit or the sensor information reading unit so that they can operate at high speeds when the display apparatus is actually contacted. Furthermore, it is possible to reduce or prevent the display apparatus from being mistakenly determined as being contacted with an object due to the shadow of the object, even if the object does not actually contact the display apparatus.

A display apparatus according to an embodiment of the present invention is capable of easily determining whether or not an object contacts the display apparatus by using an additional contact detecting layer and thus without interpreting a captured image using an optical sensor.

Also, the display apparatus can realize lower power consumption and reduce or prevent erroneous sensing caused by the shadow of an object.

While this invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A display apparatus comprising:
   a first substrate;
   a second substrate;
   an optical layer between the second substrate and the first substrate, the optical layer comprising a plurality of pixels for displaying an image and an array of optical sensors for detecting a contact location on the display apparatus; and
   a contact detector for detecting whether or not the display apparatus is touched, the contact detector comprising a variable capacitor and being configured to detect whether or not the display apparatus is touched through measuring a change in capacitance of the variable capacitor,
   wherein the variable capacitor comprises: a contact detecting layer on the optical layer and a cathode electrode of the pixels,
      wherein the contact detecting layer is on an entire surface of the first substrate, and
   wherein when the contact detector detects that the display apparatus is touched, the array of optical sensors are selected to detect the contact location on the display apparatus.

2. The display apparatus of claim 1, further comprising a dielectric layer on the contact detecting layer.

3. The display apparatus of claim 1, wherein the second substrate is between the contact detecting layer and the optical layer.

4. A display apparatus comprising:
   a display panel comprising:
      a plurality of pixels for displaying an image;
      a plurality of optical sensors between a first substrate and a second substrate for detecting a contact location of an object on the display panel; and
   a contact detector for detecting whether or not the display apparatus is touched, the contact detector comprising a variable capacitor and being configured to detect whether or not the display apparatus is touched through measuring a change in capacitance of the variable capacitor,
      wherein the variable capacitor comprises: a contact detecting layer on the optical sensors; and a cathode electrode of the pixels, and
      wherein the contact detecting layer is on an entire surface of the first substrate; and
   a contact location determining unit for determining the contact location on the display panel in accordance with a signal output by the optical sensors based on a touch detection result of the contact detecting layer,
      wherein the contact location is determined based only on the signal output by the optical sensors, and
      wherein when the contact detecting layer detects that the display panel is touched, the plurality of optical sensors are selected to detect the contact location on the display apparatus.

5. The display apparatus of claim 4, wherein the contact detecting layer is embedded within the display panel.

6. The display apparatus of claim 4, wherein the contact detecting layer is on a surface of the display panel.

7. The display apparatus of claim 4, wherein the contact location determining unit comprises a contact measuring unit for receiving contact information from the contact detecting layer and measuring a degree of change in the contact information.

8. The display apparatus of claim 7, wherein the contact information comprises at least one of capacitance, a dielectric constant, a gap, or a resistance value.

9. The display apparatus of claim 7, wherein the contact location determining unit further comprises a contact determining unit for determining whether or not the display panel is contacted in accordance with the degree of change in the contact information output by the contact measuring unit.

10. The display apparatus of claim 9, wherein the contact determining unit is configured to determine whether or not the display panel is contacted by comparing the degree of change in the contact information with a reference value.

11. The display apparatus of claim 9, wherein the contact location determining unit further comprises a signal generating unit for generating a first signal or a second signal, where the first signal instructs that the optical sensors be driven and information be read from the optical sensors when the contact is detected and the second signal instructs that the driving of the optical sensors and the reading of the information from the optical sensors be discontinued when the contact is not detected.

12. The display apparatus of claim 11, further comprising a sensor array driving unit for driving the optical sensors when the first signal is received from the signal generating unit.

13. The display apparatus of claim 11, further comprising a sensor information reading unit for receiving sensed signals from the optical sensors and for providing the sensed signals to the contact location determining unit.

14. The display apparatus of claim 13, wherein the contact location determining unit further comprises a coordinate calculating unit for determining the contact location in accordance with the sensed signals received from the sensor information reading unit.

15. A method of determining a contact location on a display apparatus that comprises a display panel comprising a plurality of pixels, an array of optical sensors between a first substrate and a second substrate and a contact detecting layer, a sensor array driving unit, a sensor information reading unit, and a contact location determining unit, the method comprising:
- detecting contact information of an object on the display panel by measuring a change in capacitance of a capacitor comprising: a contact detecting layer on the optical sensors; and a cathode electrode of the pixels, wherein the contact detecting layer is on an entire surface of the first substrate;
- if there is no contact, deactivating the sensor array driving unit to not select the array of optical sensors and the sensor information reading unit; and
- if there is a contact, activating the sensor array driving unit to select the array of optical sensors and the sensor information reading unit to read sensed signals from the optical sensors,
- wherein the contact location is determined based only on a signal output by the optical sensors.

16. The method of claim 15, further comprising obtaining an image of the object contacting the display panel according to scan signals received from the sensor array driving unit.

17. The method of claim 16, further comprising calculating coordinates of a location of the contact by analyzing the image.

18. A display apparatus comprising:
- an image display unit comprising a display region comprising a plurality of pixels between a first substrate and a second substrate, and wherein each of the pixels comprises a cathode electrode, an anode electrode, and a light emitting layer between the cathode electrode and the anode electrode;
- a contact detection unit for determining whether or not the display apparatus is touched, the contact detection unit comprising a variable capacitor configured to change capacitance when an object or a finger is applied to the display apparatus; and
- a contact location identifying unit for determining a location on the display region that is touched,
- wherein the variable capacitor comprises:
  - the cathode electrode of the pixels; and
  - a first contact detecting layer; or
  - the first contact detecting layer; and
  - a second contact detecting layer spaced from and parallel to the first contact detecting layer,
- wherein the first and the second contact detecting layers are on an entire surface of the first substrate, and
- wherein the second substrate is between the first substrate and the first contact detecting layer or the second contact detecting layer, and is also between the first contact detecting layer and the second contact detecting layer.

19. A display apparatus comprising:
- a first substrate;
- an optical layer on the first substrate, the optical layer comprising a plurality of pixels for displaying an image and an array of optical sensors for detecting a contact location on the display apparatus; and
- a contact detector detecting whether or not the display apparatus is touched,
- wherein the contact detector comprises a variable capacitor for detecting whether or not the display apparatus is touched through capacitance measurement, and
- wherein the variable capacitor comprises:
  - a first contact detecting layer; and
  - a second contact detecting layer between the first contact detecting layer and the optical layer,
- wherein the first contact detecting layer is on an entire surface of the first substrate, and
- wherein when the contact detector detects that the display apparatus is touched, the array of optical sensors are selected to detect the contact location on the display apparatus.

20. The display apparatus of claim 19, further comprising a dielectric layer between the first and second contact detecting layers.

21. The display apparatus of claim 20, wherein the dielectric layer comprises a material having a dielectric constant or a gap that changes according to pressure applied to the dielectric layer.

22. The display apparatus of claim 21, further comprising a second substrate between the dielectric layer and the second contact detecting layer.

23. The display apparatus of claim 20, further comprising a second substrate between the second contact detecting layer and the optical layer.

24. The display apparatus of claim 19, further comprising a second substrate between the first and second contact detecting layers.

* * * * *